United States Patent [19]
Freeman

[11] Patent Number: 5,313,228
[45] Date of Patent: May 17, 1994

[54] METHOD AND APPARATUS FOR INTERACTIVELY GENERATING ELECTRONIC IMAGE CREATION TOOLS

[75] Inventor: Stephen Freeman, Bedfordshire, England

[73] Assignee: Crosfield Electronics Limited, Herts, England

[21] Appl. No.: 949,363

[22] Filed: Sep. 23, 1992

Related U.S. Application Data

[63] Continuation of Ser. No. 644,667, Jan. 23, 1991, abandoned.

[30] Foreign Application Priority Data

Jan. 23, 1990 [GB] United Kingdom ................. 9001516

[51] Int. Cl.⁵ ............................................ G09G 3/02
[52] U.S. Cl. .................................... 345/145; 345/127
[58] Field of Search ............... 340/743, 723, 725, 721, 340/731, 724; 364/474.24; 395/128; 345/145, 127, 131, 133, 138, 157, 150, 156

[56] References Cited

U.S. PATENT DOCUMENTS

| | | | |
|---|---|---|---|
| 4,514,818 | 4/1985 | Walker | 340/703 |
| 4,739,317 | 4/1988 | Berry et al. | 340/723 |

FOREIGN PATENT DOCUMENTS 9110952  7/1991  World Int. Prop. O. .

OTHER PUBLICATIONS

Swokowski, Earl; Calculus w/Analytic Geometry, 1983 pp. 15–16, 565–570, 594–595, 598.
LisaDraw, 1984 pp. 137–138.
"Direct Graphics Manipulation", IBM Technical Disclosure Bulletin, vol. 31, No. 12, May 1989, pp. 364–366.

*Primary Examiner*—Tommy P. Chin
*Assistant Examiner*—A. Au
*Attorney, Agent, or Firm*—Sughrue, Mion, Zinn, Macpeak & Seas

[57] ABSTRACT

A method and apparatus for interactively generating a profile for an electronic image creation tool. The apparatus comprises a monitor (30); an operator input device (5, 31) ; a store (22) for storing the profile of an electronic image creation tool; and a processing system (1,2). The processing system is adapted to display an initial form of profile on the monitor (30), the digitizing tablet being operated by an operator so as to position an indicator on the monitor display at a desired position relative to the display profile. The processing system (1,2) is adapted to determine one or both of the distance of the indicator position from a datum position and the direction of the indicator position relative to a datum direction, and to monitor the profile in accordance with a predetermined algorithum dependent on the determined distance and/or determined direction.

5 Claims, 4 Drawing Sheets

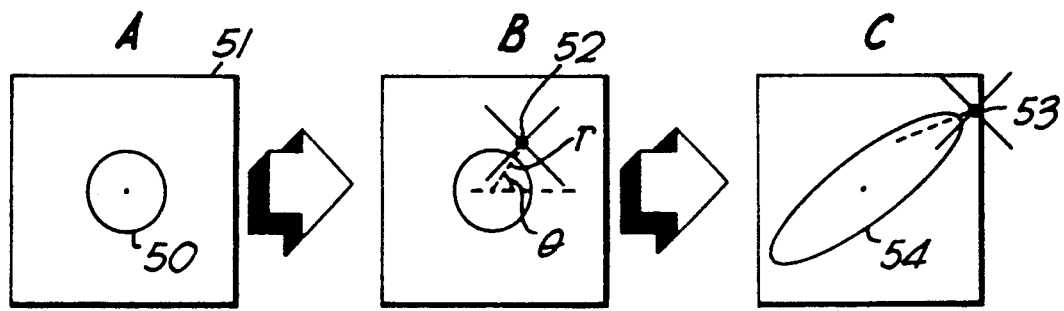
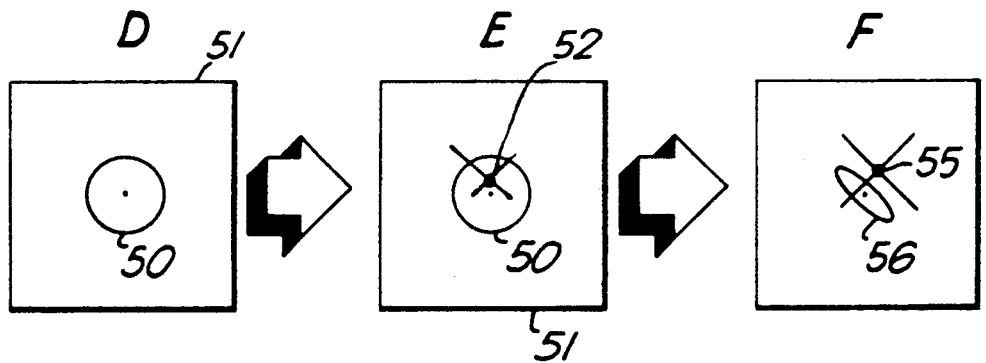
Fig. 4.

METHOD AND APPARATUS FOR INTERACTIVELY GENERATING ELECTRONIC IMAGE CREATION TOOLS

This is a continuation of Application Ser. No. 07/644,667 filed Jan. 23, 1991, now abandoned.

FIELD OF THE INVENTION

The invention relates to methods and apparatus for generating electronic image creation tools.

DESCRIPTION OF THE PRIOR ART

Conventional electronic painting systems offer a range of tool or brush types, shapes and sizes. Often a facility for making custom brush profiles is provided. Conventional custom brush making methods are slow and poor at creating relatively simple anti-aliased brushes. Circular brushes are the most often used, but various elliptical brushes are desirable. If elliptical brushes are offered, it is usually the case that the particular profiles on offer are not quite what is required. For example, a much bigger or smaller ratio between the major and minor axes may be desireable, or the axes may need to be tilted with respect to the horizontal. One solution is to provide many different styles of elliptical brushes but this leads to significant complication in selecting the correct brush.

SUMMARY OF THE INVENTION

In accordance with one aspect of the present invention a method of interactively generating a profile for an electronic image creation tool comprises displaying an initial form of profile; positioning an indicator at a desired position relative to the displayed profile; determining one or both of the distance of the indicator position from a datum position and the direction of the indicator position relative to a datum direction; and modifying the profile in accordance with a predetermined algorithm dependant on the determined distance and/or the determined direction.

In accordance with a second aspect of the present invention, apparatus for interactively generating a profile for an electronic image creation tool comprises a monitor; an operator input device; a store for storing the profile of an electronic image creation tool; and processing means, the processing means being adapted to display an initial form of profile on the monitor, the input device being operated by an operator so as to position an indicator on the monitor display at a desired position relative to the displayed profile, the processing means being adapted to determine one or both of the distance of the indicator position from a datum position and the direction of the indicator position relative to a datum direction, and modifying the profile in accordance with a predetermined algorithm dependant on the determined distance and/or the determined direction.

This invention provides a solution to the problems mentioned above by allowing the operator to construct his own tool profile in an interactive manner.

Typically, once the operator has constructed a satisfactory profile, the method further comprises storing the final profile.

The indicator will typically comprise a cursor whose position is determined by the input device. The input device can have a conventional form such as a digitizing tablet and the like.

Typically, the profile will be stored in the form of a raster pattern.

The datum position will typically be constituted by the geometric centre of the initial profile although this is not essential while the datum direction will in general be related to the raster direction of the monitor, for example horizontal. In general, the initial profile will comprise a circle but it could also be in the form of an ellipse, or any other profile.

In the case of an initial form of profile comprising a circle or ellipse, the method preferably comprises comparing the distance (current r) of the current indicator position from the datum position with the distance of the indicator initially (initial r) and, (a) if the current distance is greater than the initial distance generating an elliptical profile having a major axis extending in the direction of the current indicator Position relative to the datum direction and with a dimension increased by the factor current r/initial r while the minor axis dimension is unchanged; and (b) if current r < initial r, creating an elliptical profile whose minor axis is parallel with the direction of the current indicator position relative to the datum direction and whose dimension is reduced by the factor current r/initial r, the major axis dimension being unchanged.

More generally, the invention can be used to distort any existing brush profile as will be explained in more detail below.

In accordance with a third aspect of the present invention, a method of generating an image electronically comprises interactively generating a profile for an electronic image creation tool using a method according to the first aspect of the invention; storing the finally generated profile; and then generating an image electronically using the stored tool.

In accordance with a fourth aspect of the present invention, apparatus for generating electronically and image comprises apparatus for interactively generating a profile for an electronic image creation tool according to the second aspect of the invention; an image generation means responsive to the stored tool to enable an operator to generate an image using the stored tool.

Typically, the processing means will be formed by part of the image generation means.

BRIEF DESCRIPTION OF THE DRAWINGS

An example of a method and apparatus according to the invention will now be described with reference to the accompanying drawings, in which:

FIGS. 4A-4F illustrate different stages in two implementations of the invention.

DETAILED DESCRIPTION OF AN EMBODIMENT

Figure 1:
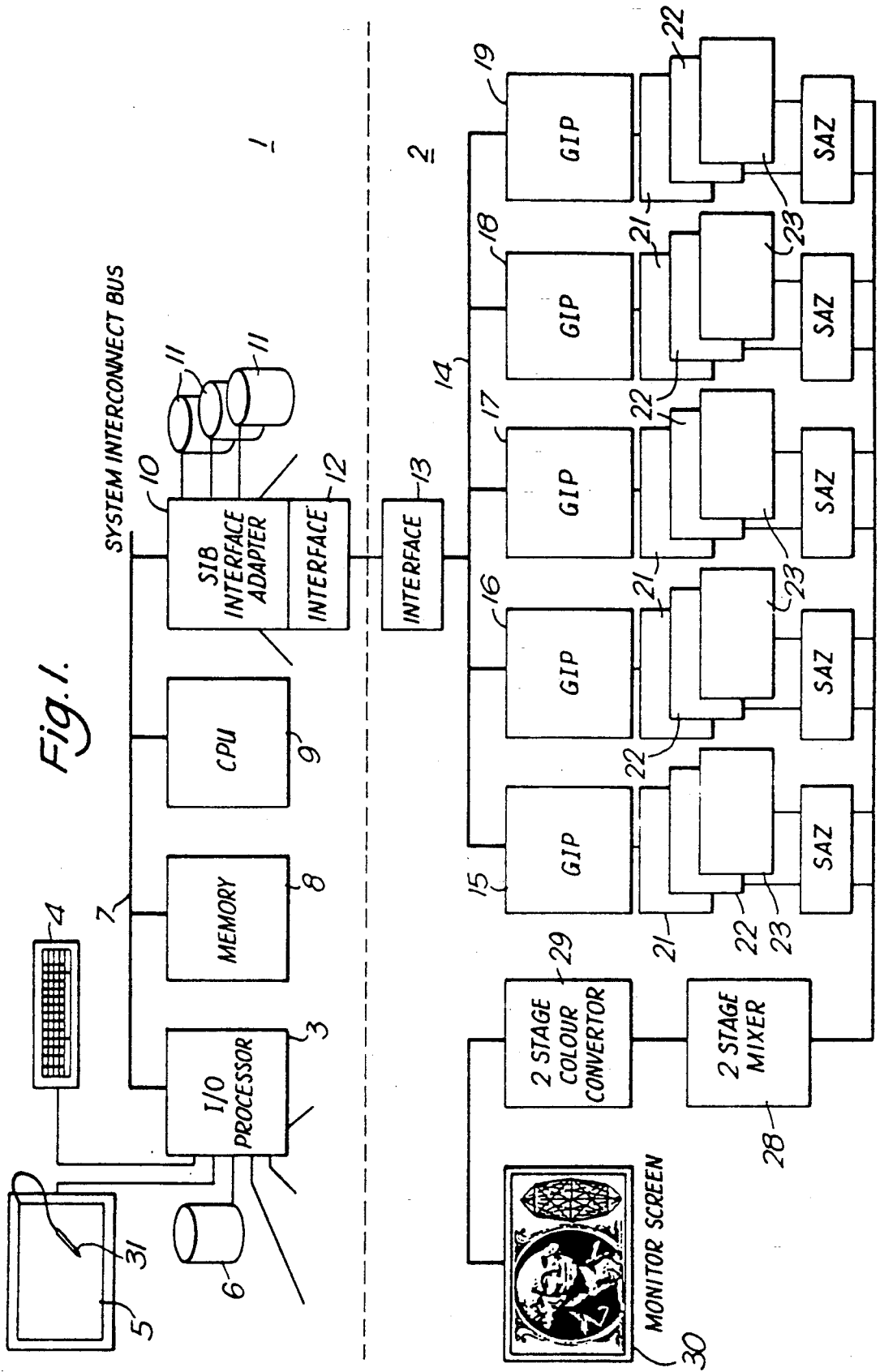
FIG. 1 is a block diagram of the apparatus.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/O processor 3 coupled to a keyboard 4, a digitizing tablet 5 and associated pen 31, a system disk 6 and other data sources (not shown). The I/O processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the colour content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The programme that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to programme.

The graphics sub-system 2 comprises an interface 13 which connects the graphics part to the host 1, the interface 13 being connected to a bus 14. The bus 14 is connected to five graphics image processors (GIPS) 15-19. In this embodiment, it is assumed that the images are defined by four colour components, namely cyan, magenta, yellow and black, there being a separate GIP for each colour. Thus, the GIP 15 processes the cyan colour component, the GIP 16 the magenta colour component, the GIP 17 the yellow colour component and the GIP 18 the black colour component. If the image was represented by a different number of colour components, for example red, green and blue then only three of the GIPs would be needed. The advantage of providing the GIPs 15-18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

Figure 2:
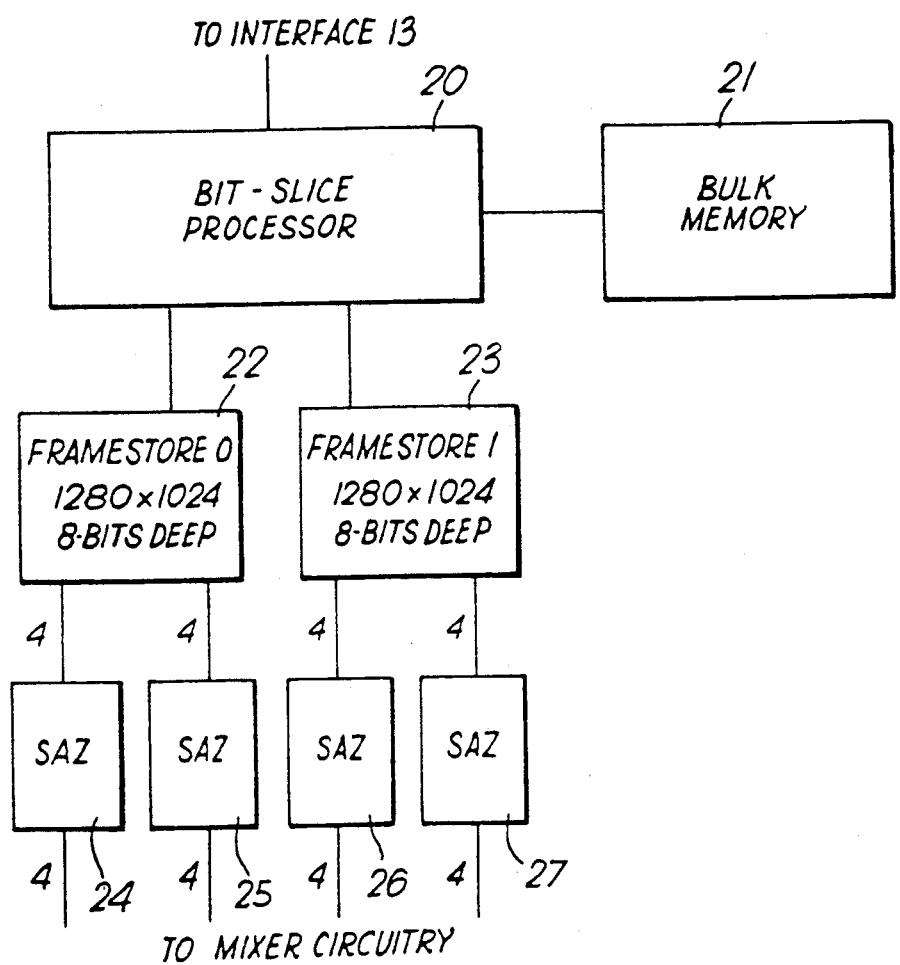
FIG. 2 is a block diagram of a graphic image processor of FIG. 1.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions 1280×1024 is 8 bits deep. In the GIPs 15-18, each framestore will hold 8 bit colour data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24-27 which operate in a conventional manner to perform one or more of the functions of scroll, zoom and amplify, the outputs from these circuits being fed to a mixer circuit 28. The circuit 28 mixes the data from each of the framestores 22 associated with the GIPs 15-18 with the data from each of the framestores 23 associated with the GIPs 15-18 in accordance with the mask stored in the framestore 22 of the GIP 19. This mixer circuit which operates in two stages is described in more detail in EP-A-0344976.

The output from the mixer circuit 28 is fed to a two stage colour converter 29 which converts the four colour component data to three colour component data e.g. red, green and blue suitable for controlling the display on a monitor screen 30.

In use, images are stored on the high speed image disks 11 and these images may have been generated by scanning original transparencies or other representations or they may have been created electronically using an electronic paint brush. The host 1 causes relevant portions of these images to be "paged" in and out of the bulk memory 21 in the GIPs 15-18 and brush profiles to be loaded and unloaded from the bulk memory 21 in the GIP 19. The interface adaptor 10 has its own 68020 processor to allow it independently to control the disks 11. The GIPs 15-18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane".

Figure 3:
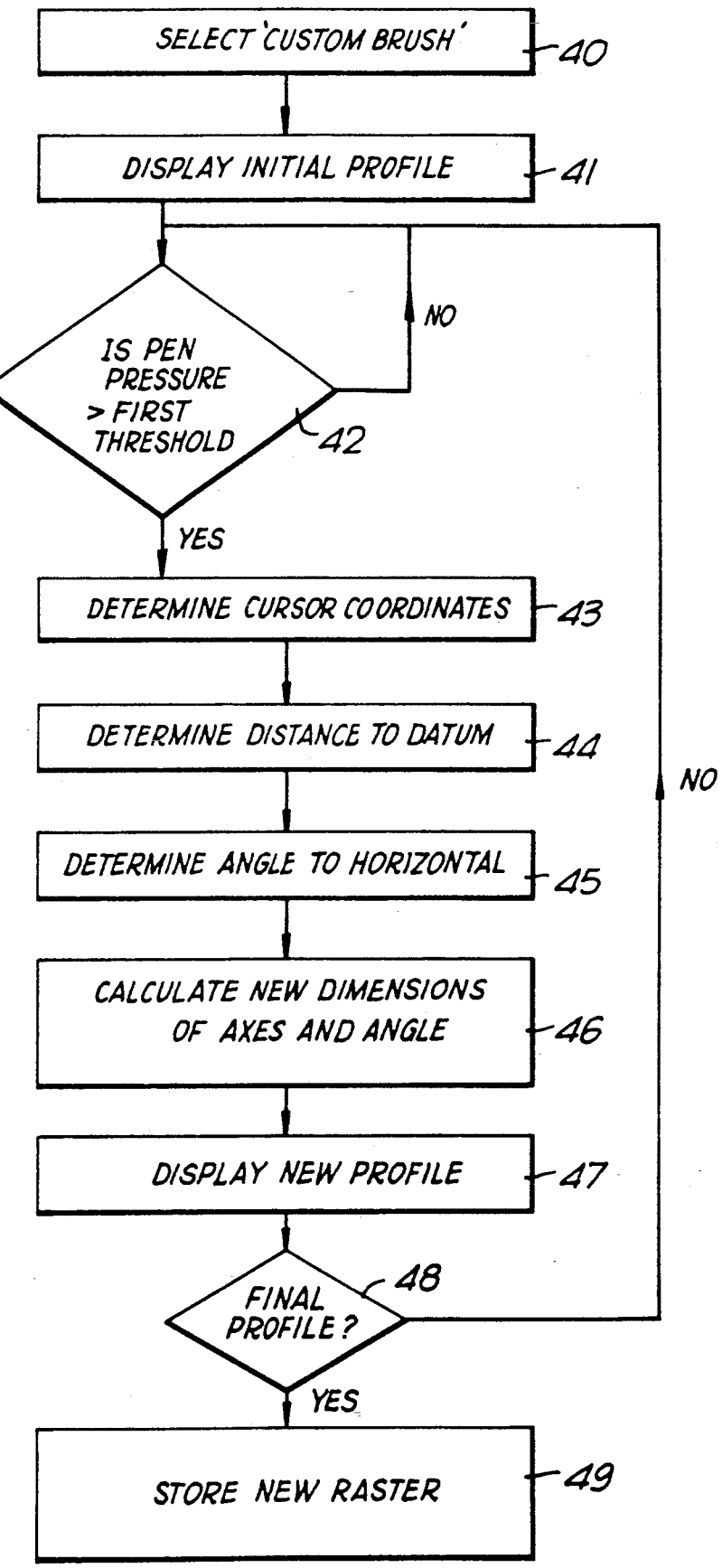
FIG. 3 is a flow diagram illustrating operation of the apparatus.

At least one brush profile is stored by the host in terms of parameters which are used by the host to compute a raster when the brush is selected. The raster pattern is then downloaded to the bulk memories 21 of the GIPs 15-19. The invention will be described primarily in connection with a previously stored circular brush profile although an indication will be given of how to extend the invention to more general profiles. Initially, the operator selects via the keyboard 4 or using the digitizing tablet 5 from the screen 30, a "custom brush" option (step 40, FIG. 3). Having selected this option and an initial, prestored brush profile, data defining that brush profile is calculated by the host and then downloaded by the host 1 into the bulk memories 21 of the GIPs 15-19. In addition, the profile is loaded into the framestore 22 of the GIP 19 causing the profile 50 to be displayed on the monitor 30 (step 41). The framestore 22 of the GIP 19 is also loaded with data causing a much larger square outline 51 to be displayed on the monitor 30 (FIG. 4A).

The operator then moves the pen 31 so as to cause the cursor displayed on the monitor screen 30 to be positioned within the square outline 51 and the host 1 monitors the pressure applied by the pen 31 on the digitizing tablet 5 so as to detect when this pressure exceeds a first threshold (step 42). FIG. 4B illustrates an example of an initial point 52 at which the pen is pressed down onto the digitizing tablet 5 with a pressure exceeding the first threshold. The host 1 defines the position of the cursor 52 in terms of screen pixels relative to the bottom left hand corner of the screen 30 and for the purposes of applying a distortion algorithm, it is convenient to redefine the cursor position in terms of coordinates relative to the centre of the original, circular profile 50. Thus, the position of the cursor 52 is recalculated by the host 1 in terms of a distance "r" from the centre of the circle 50 and an angle theta to the raster direction which, in this case, is horizontal (FIG. 4B). Thus, if the cursor coordinates relative to the bottom left hand corner of the screen 30 are $X_s Y_s$ and the coordinates of the centre of the circle 50 are $X_c Y_c$ then in a step 43 the host 1 computes the coordinates X',Y' of the cursor 52 relative to the centre of the circle 50 in accordance with the formula:

$$X',Y' = (X_s - X_c, Y_s - Y_c)$$

In a step 44, the host 1 computes the initial distance r (init r) in accordance with the formula:

$$\text{init } r = \sqrt{((X')^2 + (Y')^2)}$$

In a step 45 the host 1 then calculates the initial angle theta (init theta) in accordance with the following formula:

$$\text{init } \theta = \arctan (Y'/X')$$

This initial point 52 (FIG. 4B) is the point from which all distortions are calculated from. In order to keep interactivity high, the circular outline and distorted outline only are displayed, and the actual brush data is not modified until the user has defined an acceptable outline.

Consider now the position when the pen 31 has been moved such that the cursor is at a position 53 (FIG. 4C). Once again, the pen pressure is monitored and assuming the pressure exceeds the first threshold (step 42) the new coordinates of the cursor position 53 are determined including its distance (current r) and angle (current theta) in steps 44 and 45. From these new coordinates, the host 1 computes the major and minor axes of an ellipse 54 which is to be displayed (step 46). In this process, the host 1 computes the value current r/init r which will be referred to as F. If F > = 1 then the major axis of the new elliptical profile is set at an angle equal to the current theta to the horizontal and the major axis is stretched by a factor F over its previous value. The minor axis which is orthogonal to the major axis, is maintained constant. The new dimensions of the ellipse are then sent by the host 1 to the GIP 19 which computes coordinates of the pixels which will correspond to the new elliptical profile, these pixels being activated in the framestore 22 thus causing the elliptical profile 54 to be displayed on the screen 30 (FIG. 4C).

If the factor F is less than 1, then this indicates a "shrink" of the original profile as shown in FIGS. 4D–4F. In that case, the new cursor position 55 is nearer to the original centre of the circle 50 than its previous position 52. In this situation, the minor axis of the new ellipse 56, is set to extend in a direction at the angle current theta to the horizontal and it is shrunk over its previous value by the factor F. The major axis, which is orthogonal to the minor axis, is maintained constant. This can be seen in FIG. 4F.

The host 1 continues to monitor the pressure applied by the pen 31 on the digitizing tablet 5. If that pressure exceeds a larger, second threshold (step 48) then the current profile is stored (step 49). This storage step involves storing a full three dimensional brush profile in the bulk memory 21 of the GIP 19 which is later transferred into the disk stores 11.

In order to understand the manner in which the new pixel values are calculated from the original pixel values, consider the following. A distortion of the original brush profile can be considered as applying a stretch in the X dimension followed by a rotation about the angle theta. In the terms of a matrix computation, the value contained in each final pixel is computed from the original pixel values in accordance with the following formula:

$$\begin{pmatrix} F\cos\theta & -\sin\theta \\ F\sin\theta & \cos\theta \end{pmatrix} \begin{pmatrix} X \\ Y \end{pmatrix} = \begin{pmatrix} X_o \\ Y_o \end{pmatrix}$$

where $X_o, Y_o$ are the coordinates of the output pixel in question.

In practice, in most cases, an output pixel will not correspond exactly with a particular input pixel. Indeed, where an expansion of the original brush profile is concerned, it is likely that the position of the required "input" pixel in the undistorted profile lies between two actual original pixels. In view of this, for each output or final profile pixel, the inverse of the matrix shown in the above equation is applied to each output pixel coordinate so as to calculate to sub-pixel accuracy the location of the "ideal" input pixel. Thus, the formula which the host 1 applies has the form shown below:

$$\begin{pmatrix} X' \\ Y' \end{pmatrix} = 1/(F\cos^2\theta + \sin^2\theta) \begin{pmatrix} \cos\theta & \sin\theta \\ -F\sin\theta & F\cos\theta \end{pmatrix} \begin{pmatrix} X_0 \\ Y_0 \end{pmatrix}$$

Once the coordinates X', Y' of the "ideal" input pixel have been located then the value of the "pixel" at that coordinate is computed as a weighted average of the four real input pixels overlapping the ideal input pixel. The tern "weighted" simply means a conventional two dimensional linear interpolation.

In practice, the host 1 calculates the inverse matrix. The original brush profile is stored in the bulk memory 21 of the GIP 19 and the profile of the distorted brush is stored in the framestore 22. The host 1 passes the elements of the inverse matrix to the GIP 19 which applies the matrix to every point in the output raster in the framestore 22. Once the final brush profile has been computed it can then be stored in the bulk memory 21 and therefter in the disks stores 11.

As has been mentioned, the original profile can be of any shape, not necessarily a circular Gaussian. For example, the invention can be used to distort a hardedged profile.

I claim:

1. A method of interactively generating a three-dimensional profile for an electronic image creation tool, the method comprising the steps of: displaying an initial form of the three dimensional profile which, in cross-section, defines a boundary in the form of a circle or ellipse; positioning an indicator at a desired position relative to the displayed profile; determining a distance of said indicator position from a datum position and a direction of said indicator position relative to said datum direction; comparing a current distance to said indicator from said datum position with an initial distance of said indicator, and, a) if said current distance is greater than said initial distance, generating a resultant elliptical profile having a major axis extending in a direction of the current indicator position relative to said datum direction and with a dimension increased by a factor defined as said current distance divided by said initial distance while a minor axis dimension is unchanged; and b) if said current distance is less than said initial distance, creating a resultant elliptical profile whose minor axis is parallel with a direction of the current indicator position relative to said datum direction and whose dimension is reduced by a factor defined as said current distance divided by said initial distance while a major axis dimension is unchanged.

2. A method according to claim 1, wherein the datum position is constituted by the geometric centre of said circle or ellipse.

3. A method according to claim 1, wherein the resultant elliptical profile is in the form of a raster pattern, the datum direction being parallel with the raster direction.

4. A method according to claim 1, further comprising storing said resultant profile.

5. A method of generating an image electronically, the method comprising the steps of: interactively generating a three-dimensional profile for an electronic image creation tool which has been created by a method comprising the steps of: displaying an initial form of the three dimensional profile which, in cross-section, defines a boundary in the form of a circle or ellipse; positioning an indicator at a desired position relative to the displayed profile; determining a distance of said indicator position form a datum position and a direction of said indicator position relative to said datum direction; comparing a current distance of said indicator from said datum position with an initial distance of said indicator and, a) if said current distance is greater than said initial distance, generating a resultant elliptical profile having a major axis extending in a direction of the current indicator position relative to said datum direction and with a dimension increased by a factor defined as said current distance divided by said initial distance while a minor axis dimension is unchanged; and b) if said current distance is less than said initial distance, creating a resultant elliptical profile whose minor axis is parallel with a direction of the current indicator position relative to said datum direction and whose dimension is reduced by a factor defined as said current distance divided by said initial distance while a major axis dimension is unchanged;

storing the generated profile; and using the generated profile as the electronic image creation tool for generating an image electronically.

* * * * *